United States Patent
Parker (10) Patent No.: US 11,609,023 B1
(45) Date of Patent: Mar. 21, 2023

(54) DUAL-WHEEL HVAC SYSTEM AND METHOD HAVING IMPROVED FROST RESISTANCE

(71) Applicant: NovelAire Technologies, L.L.C., Baton Rouge, LA (US)

(72) Inventor: Terry Parker, Baton Rouge, LA (US)

(73) Assignee: NovelAire Technologies, L.L.C., Baton Rouge, LA (US)

( * ) Notice: Subject to any disclaimer, the term of this patent is extended or adjusted under 35 U.S.C. 154(b) by 51 days.

(21) Appl. No.: 16/894,319

(22) Filed: Jun. 5, 2020

Related U.S. Application Data (60) Provisional application No. 62/858,125, filed on Jun. 6, 2019.

(51) Int. Cl.
*F24F 12/00* (2006.01)
*F25B 27/02* (2006.01)
*F24F 3/14* (2006.01)
*F25B 47/02* (2006.01)

(52) U.S. Cl.
CPC .......... *F24F 12/006* (2013.01); *F24F 3/1411* (2013.01); *F25B 27/02* (2013.01); *F25B 47/022* (2013.01)

(58) Field of Classification Search
CPC ........ F24F 12/00; F24F 12/001; F24F 12/002; F24F 12/006; F24F 3/1411; F24F 3/1423; F24F 2203/1032; F24F 2203/1036; F24F 2203/10; F24F 2203/104; F24F 2203/1056; F24F 2203/106; F25B 27/02; F25B 47/022
See application file for complete search history.

(56) References Cited

U.S. PATENT DOCUMENTS

| | | | |
|---|---|---|---|
| 5,401,706 A | 3/1995 | Fischer | |
| 5,448,895 A * | 9/1995 | Goellner | F24F 12/003 62/94 |
| 5,496,397 A | 3/1996 | Fischer et al. | |
| 5,579,647 A * | 12/1996 | Galton | F24F 5/001 62/94 |
| 5,649,428 A | 7/1997 | Calton et al. | |
| 5,758,511 A * | 6/1998 | Yoho | F24F 3/1411 62/271 |

(Continued)

OTHER PUBLICATIONS

SEMCO Incorporated, Desiccant Wheel Products, Pinnacle™ Primary Ventilation System, Technical Guide, 1999-2001, 31 pages.

(Continued)

*Primary Examiner* — Miguel A Diaz
(74) *Attorney, Agent, or Firm* — Jones Walker LLP (57) ABSTRACT

An improved HVAC system and method for simultaneously controlling the temperature and humidity of an indoor space while providing high quantities of outdoor air is described herein. The HVAC system of the present invention utilizes a heating source positioned in the supply passageway between an energy recovery wheel and a dehumidification wheel in order to control the temperature and humidity of air supplied to the indoor space while preventing frost build-up on the energy recover wheel. By positioning a heating source between the energy recovery wheel and a dehumidification wheel, the system is able to prevent frost accumulation on the energy recovery wheel during winter operation while also increasing the relative humidity of the supply air.

12 Claims, 8 Drawing Sheets

(56) References Cited

U.S. PATENT DOCUMENTS

| | | | | |
|---|---|---|---|---|
| 5,782,104 | A * | 7/1998 | Sami | F24F 3/1411 |
| | | | | 62/271 |
| 6,199,388 | B1 | 3/2001 | Fischer, Jr. | |
| 6,328,095 | B1 * | 12/2001 | Felber | F24F 3/1423 |
| | | | | 165/222 |
| 6,675,601 | B2 * | 1/2004 | Ebara | F24F 1/0007 |
| | | | | 62/271 |
| 9,891,005 | B2 * | 2/2018 | Rich | H05K 999/99 |
| 10,066,877 | B2 * | 9/2018 | Rich | F24F 12/006 |
| 10,197,310 | B2 * | 2/2019 | Ghadiri Moghaddam | |
| | | | | H05K 7/20745 |
| 10,690,358 | B2 | 6/2020 | Fischer | |
| 11,015,845 | B2 * | 5/2021 | Ghadiri Moghaddam | |
| | | | | F25B 25/005 |
| 2003/0074913 | A1 * | 4/2003 | Ebara | F24F 3/1423 |
| | | | | 62/271 |
| 2010/0084483 | A1 * | 4/2010 | Pieper | F24F 3/147 |
| | | | | 236/44 A |
| 2013/0248147 | A1 * | 9/2013 | Wintemute | F28D 15/02 |
| | | | | 165/96 |
| 2015/0135755 | A1 | 5/2015 | Rich et al. | |
| 2017/0356661 | A1 | 12/2017 | Fischer | |

OTHER PUBLICATIONS

Fläkt Group, SEMCO, Pinnacle Series, Dedicated Outdoor Air System, Pinnacle® Primary Ventilation System, 2018, 12 pages.
Fläkt Group, SEMCO, Pinnacle® Primary Ventilation System, 2018, 2 pages.
Fläkt Group, SEMCO, Pinnacle® Series, Dedicated Outdoor Air System Sales Brochure, 2020, 9 pages.
Fläkt Group, SEMCO, Pinnacle® II System, Dedicated Outdoor Air System Technical Guide, 2020, 19 pages.

* cited by examiner

FIG. 1A
(Prior Art)

| State Points | | | | | | | | | | | | |
|---|---|---|---|---|---|---|---|---|---|---|---|---|
| Point | Flowrate (cfm) | Dry Bulb Temp (°F) | Wet Bulb Temp (°F) | Rel. Humidity (%) | Absolute Humidity (gr/lb) | Specific Volume (ft³/lb) | Enthalpy (Btu/lb) | Dew Point (°F) | Density (lb/ft³) | Vapor Pressure (in. HG) | gr/ft³ |
| A | 8000 | -30.0 | -30.0 | 97.6 | 1.0 | 10.84 | -7.03 | -30.4 | 0.0922 | 0.0068 | .09 |
| B | 8000 | -8.0 | -9.7 | 27.8 | 1.0 | 11.40 | -1.77 | -30.4 | 0.0877 | 0.0068 | .09 |
| C | 8000 | 48.1 | 39.2 | 42.8 | 21.2 | 12.87 | 14.82 | 27.2 | 0.0779 | 0.1444 | 1.65 |
| D | 8000 | 48.1 | 39.2 | 42.8 | 21.2 | 12.87 | 14.82 | 27.2 | 0.0779 | 0.1444 | 1.65 |
| E | 8000 | 76.3 | 52.5 | 15.8 | 21.2 | 13.59 | 21.63 | 27.2 | 0.0738 | 0.1444 | 1.56 |
| F | 8000 | 68.0 | 51.5 | 30.0 | 30.5 | 13.40 | 21.08 | 35.5 | 0.0749 | 0.2074 | 2.28 |
| G | 8000 | 68.0 | 51.5 | 30.0 | 30.5 | 13.40 | 21.08 | 35.5 | 0.0749 | 0.2074 | 2.28 |
| H | 8000 | 11.9 | 11.9 | 99.7 | 10.1 | 11.92 | 4.39 | 11.8 | 0.0840 | 0.0690 | .85 |

| Processes | | Cooling (MBH) | | Moisture (lb/hr) | | | |
|---|---|---|---|---|---|---|---|
| From/To | Type | Sensible | Latent | Removed | Added | Heating Sensible (MBH) | Total (MBH) |
| A / B | Heating | 0 | 0 | 0 | 0 | 189.6 | 189.6 |
| B / C |  | .0 | .0 | .0 | 103.9 | 484.4 | 596.9 |
| C / D |  | .0 | .0 | .0 | .0 | .0 | .0 |
| D / E | Heating | 0 | 0 | 0 | 0 | 245.5 | 245.5 |
| F / G |  | .0 | .0 | .0 | .0 | .0 | .0 |
| G / H |  | 484.0 | 116.7 | 104.9 | .0 | -484.0 | 600.7 |

State Points

| Point | Flowrate (cfm) | Dry Bulb Temp (°F) | Wet Bulb Temp (°F) | Rel. Humidity (%) | Absolute Humidity (gr/lb) | Specific Volume (ft³/lb) | Enthalpy (Btu/lb) | Dew Point (°F) | Density (lb/ft³) | Vapor Pressure (in. HG) | gr/ft³ |
|---|---|---|---|---|---|---|---|---|---|---|---|
| A | 8000 | -30.0 | -30.0 | 97.6 | 1.0 | 10.84 | -7.03 | -30.4 | 0.0922 | 0.0068 | .09 |
| B | 8000 | 87.0 | 56.8 | 11.0 | 21.0 | 13.86 | 24.19 | 27.0 | 0.0724 | 0.1431 | 1.52 |
| C | 8000 | 87.0 | 56.8 | 11.0 | 21.0 | 13.86 | 24.19 | 27.0 | 0.0724 | 0.1431 | 1.52 |
| D | 8000 | 87.0 | 56.8 | 11.0 | 21.0 | 13.86 | 24.19 | 27.0 | 0.0724 | 0.1431 | 1.52 |
| E | 8000 | 87.0 | 56.8 | 11.0 | 21.0 | 13.86 | 24.19 | 27.0 | 0.0724 | 0.1431 | 1.52 |
| F | 8000 | 68.0 | 51.5 | 30.0 | 30.5 | 13.40 | 21.08 | 35.5 | 0.0749 | 0.2074 | 2.28 |
| G | 8000 | 130.0 | 72.9 | 4.6 | 30.5 | 14.98 | 36.15 | 35.5 | 0.0671 | 0.2074 | 2.04 |
| H | 8000 | 13.0 | 12.8 | 96.3 | 10.3 | 11.95 | 4.68 | 12.2 | 0.0838 | 0.0703 | .86 |

Processes

| From/To | Type | Cooling (MBH) Sensible | Cooling (MBH) Latent | Moisture (lb/hr) Removed | Moisture (lb/hr) Added | Heating Sensible (MBH) | Total (MBH) |
|---|---|---|---|---|---|---|---|
| A / B | | .0 | .0 | .0 | 102.9 | 1011.6 | 1124.1 |
| B / C | | .0 | .0 | .0 | .0 | .0 | .0 |
| C / D | | .0 | .0 | .0 | .0 | .0 | .0 |
| D / E | | .0 | .0 | .0 | .0 | .0 | .0 |
| F / G | Heating | 0 | 0 | 0 | 0 | 542.7 | 542.7 |
| G / H | | 1009.4 | 123.4 | 103.9 | .0 | -1009.4 | 1132.8 |

| State Points | | | | | | | | | | | | |
|---|---|---|---|---|---|---|---|---|---|---|---|---|
| Point | Flowrate (cfm) | Dry Bulb Temp (°F) | Wet Bulb Temp (°F) | Rel. Humidity (%) | Absolute Humidity (gr/lb) | Specific Volume (ft³/lb) | Enthalpy (Btu/lb) | Dew Point (°F) | Density (lb/ft³) | Vapor Pressure (in. HG) | gr/ft³ |
| A | 8000 | -30.0 | -30.0 | 97.6 | 1.0 | 10.84 | -7.03 | -30.4 | 0.0922 | 0.0068 | .09 |
| B | 8000 | 9.8 | 9.8 | 99.7 | 9.7 | 11.87 | 3.82 | 11.0 | 0.0844 | 0.0662 | .82 |
| C | 8000 | 9.8 | 9.8 | 99.7 | 9.7 | 11.87 | 3.82 | 11.0 | 0.0844 | 0.0662 | .82 |
| D | 8000 | 9.8 | 9.8 | 99.7 | 9.7 | 11.87 | 3.82 | 11.0 | 0.0844 | 0.0662 | .82 |
| E | 8000 | 83.0 | 52.3 | 5.8 | 9.7 | 13.72 | 21.45 | 11.0 | 0.0730 | 0.0662 | .71 |
| F | 8000 | 68.0 | 51.5 | 30.0 | 30.5 | 13.40 | 21.08 | 35.5 | 0.0749 | 0.2074 | 2.28 |
| G | 8000 | 68.0 | 51.5 | 30.0 | 30.5 | 13.40 | 21.08 | 35.5 | 0.0749 | 0.2074 | 2.28 |
| H | 8000 | 28.2 | 27.9 | 97.1 | 21.6 | 12.37 | 10.07 | 27.6 | 0.0811 | 0.1471 | 1.75 |

| Processes | | Cooling (MBH) | | Moisture (lb/hr) | | | |
|---|---|---|---|---|---|---|---|
| From/To | Type | Sensible | Latent | Removed | Added | Heating Sensible (MBH) | Total (MBH) |
| A / B | | .0 | .0 | .0 | 44.7 | 343.3 | 390.8 |
| B / C | | .0 | .0 | .0 | .0 | .0 | .0 |
| C / D | | .0 | .0 | .0 | .0 | .0 | .0 |
| D / E | Heating | 0 | 0 | 0 | 0 | 634.6 | 634.6 |
| F / G | | .0 | .0 | .0 | .0 | .0 | .0 |
| G / H | | 343.5 | 52.6 | 45.8 | .0 | -343.5 | 396.1 |

| State Points | | | | | | | | | | | |
|---|---|---|---|---|---|---|---|---|---|---|---|
| Point | Flowrate (cfm) | Dry Bulb Temp (°F) | Wet Bulb Temp (°F) | Rel. Humidity (%) | Absolute Humidity (gr/lb) | Specific Volume (ft³/lb) | Enthalpy (Btu/lb) | Dew Point (°F) | Density (lb/ft³) | Vapor Pressure (in. HG) | gr/ft³ |
| A | 8000 | -30.0 | -30.0 | 97.6 | 1.0 | 10.84 | -7.03 | -30.4 | 0.0922 | 0.0068 | .09 |
| B | 8000 | 54.6 | 38.9 | 16.2 | 10.2 | 13.00 | 14.68 | 12.0 | 0.0770 | 0.0696 | .78 |
| C | 8000 | 90.0 | 55.3 | 4.9 | 10.2 | 13.90 | 23.22 | 12.0 | 0.0721 | 0.0696 | .73 |
| D | 8000 | 73.6 | 52.6 | 20.9 | 25.6 | 13.53 | 21.67 | 31.2 | 0.0742 | 0.1742 | 1.89 |
| E | 8000 | 73.6 | 52.6 | 20.9 | 25.6 | 13.53 | 21.67 | 31.2 | 0.0742 | 0.1742 | 1.89 |
| F | 8000 | 68.0 | 51.5 | 30.0 | 30.5 | 13.40 | 21.08 | 35.5 | 0.0749 | 0.2074 | 2.28 |
| G | 8000 | 84.4 | 54.0 | 8.1 | 14.2 | 13.77 | 22.50 | 18.8 | 0.0728 | 0.0969 | 1.03 |
| H | 8000 | -.2 | -.5 | 91.7 | 5.0 | 11.61 | .71 | -1.9 | 0.0862 | 0.0342 | .43 |

| Processes | | | | | | | |
|---|---|---|---|---|---|---|---|
| | | Cooling (MBH) | | Moisture (lb/hr) | | | |
| From/To | Type | Sensible | Latent | Removed | Added | Heating Sensible (MBH) | Total (MBH) |
| A / B | | .0 | .0 | .0 | 47.3 | 730.7 | 781.7 |
| B / C | Heating | 0 | 0 | 0 | 0 | 307.5 | 307.5 |
| C / D | | 141.7 | .0 | .0 | 79.2 | -141.7 | 55.9 |
| D / E | | 0 | .0 | .0 | .0 | .0 | .0 |
| F / G | | .0 | 90.6 | 83.8 | .0 | 141.8 | 51.2 |
| G / H | | 729.6 | 54.8 | 47.3 | .0 | -729.6 | 784.4 |

FIG. 4B

DUAL-WHEEL HVAC SYSTEM AND METHOD HAVING IMPROVED FROST RESISTANCE

CROSS-REFERENCE TO RELATED APPLICATIONS

This application claims the benefit of U.S. Provisional Application No. U.S. 62/858,125, filed Jun. 6, 2019, which is hereby incorporated by reference herein in its entirety.

BACKGROUND

Poor indoor air quality has been directly associated with high illness rates, absenteeism, and an overall decrease in worker productivity. Consequently, design engineers are becoming increasingly aware of the need to design proper air quality into HVAC systems that simultaneously control the temperature and humidity of the indoor space while providing high quantities of outdoor air. Proper ventilation purges the conditioned space of unwanted pollutants such as organic vapors, dust, radon, etc., and it purges the space of unwanted products of human activity such as tobacco smoke, carbon dioxide, bacteria, and germs.

The ASHRAE Standard 62-1989 (Ventilation for Acceptable Indoor Air Quality), describes a recommended target ratio of makeup air to return air for a variety of application and building types. Building codes in the U.S. and abroad are becoming increasingly more comprehensive in addressing ventilation requirements. Architects and engineers are, with increasing frequency, including greater amounts of fresh air makeup in their HVAC systems. However, particularly in facilities with high occupancy rates or high levels of ingress and egress, the utilization of conventional HVAC vapor-compression refrigeration systems (DX systems) are an extremely costly solution from an energy usage perspective.

To reduce the ventilation energy penalty associated with the introduction of high quantities of outdoor air into the indoor space, HVAC systems have been developed which recover energy from the exhaust air using one or more energy recovery devices. For example, U.S. Pat. No. 6,199,388 to Fischer teaches a HVAC system that utilizes an energy recovery wheel and a dehumidification wheel placed in a series circuit arrangement with a cooling coil positioned in-between to control the temperature and humidity of air supplied to a controlled space. In cooling mode, the energy recovery wheel—which is designed to exchange both sensible and latent energy—functions to cool and dehumidify the supply air as it passes through the supply side of the wheel. The supply air is further cooled and dehumidified by passing it across the cooling coil. The supply air is then warmed and further dehumidified by passing it through the dehumidification wheel, which is designed for maximum exchange of latent energy; i.e., humidity. Meanwhile, the dehumidification wheel is warmed and dehumidified (i.e., regenerated) by passing exhaust air through its regeneration side. The cooled exhaust air then passes through the energy recovery wheel, cooling and dehumidifying the energy recovery wheel's regeneration side. In heating mode, the cooling coil is shut off, allowing the energy recovery device and dehumidification wheel to collectively function to heat and humidify the supply air stream using latent and sensible energy recovered from the exhaust air leaving the indoor space.

Prior art dual-wheel energy recovery systems such as the one disclosed in U.S. Pat. No. 6,199,388 to Fischer have been shown to provide improved dehumidification and higher energy efficiency than conventional DX systems or desiccant-based cooling systems when in cooling mode. However, in heating mode and particularly during extremely cold winter time conditions such as when the outdoor air temperature drops below zero degrees Fahrenheit (0° F.) and the relative humidity of the exhaust air nears 100%, energy recovery wheels are susceptible to frost formation. Frost formation on the wheel will plug or reduce air flow, thereby decreasing the energy savings otherwise provided by the use of the energy recovery wheel.

Several solutions have been developed to address frost formation on energy recovery wheels. These conventional solutions include: (1) preheating outdoor air; (2) heating return air going to energy recovery wheel; and (3) reducing the wheel speed.

The first conventional approach, which involves preheating the outdoor air (e.g., by utilizing a hot water coil), ensures that the outdoor air temperature does not fall low enough to cause frosting on the energy recovery wheel. There are drawbacks to this approach however. For example, much of the heat required for heating the outdoor air is not used to actually warm the indoor space. Instead, up to about 40% of the required heat, in some cases, is lost and/or is exhausted from the wheel. This is wasteful, expensive, and causes harm to the environment due to the energy waste.

The second conventional approach to address frost formation on energy recovery wheels is to heat the return air going to the wheel. In this approach, the return air is heated (e.g., by a hot water/cold water coil) before being passed through the energy recovery wheel. However, this approach suffers from the same drawbacks as the first conventional approach. In fact, this second conventional approach is generally understood to be less efficient than the first conventional approach of preheating the outdoor air, wasting up to about 40% of the generated heat in some cases.

The third conventional approach to address frost formation on energy recovery wheels is to control the speed of the wheel (i.e., reduce the speed) to reduce frost. In this approach, the relative humidity of the exhaust from the energy recovery wheel is monitored. Based on this monitored relative humidity, the wheel speed is reduced to keep the monitored relative humidity percentage below 100%. However, the principal drawback is that the reduction of the speed of the wheel reduces the amount of energy being transferred by the wheel. This third conventional approach is generally considered to be less efficient than the first and second conventional approaches.

Thus, there is a need for a new method of frost control for dual-wheel energy recovery systems that is capable of improving humidification and energy efficiency in cold weather conditions.

SUMMARY

An improved HVAC system and method for simultaneously controlling the temperature and humidity of an indoor space while providing high quantities of outdoor air is described herein. The system features an energy recovery wheel and a dehumidification wheel placed in series with a heating source positioned in-between to control the temperature and humidity of air supplied to the indoor space while preventing frost build-up on the energy recover wheel. This system prevents frosting of the energy recovery wheel while also increasing the relative humidity of the supply air, thereby reducing the amount of additional humidification required during winter conditions. The system also minimizes the amount of heat added to the system as compared to conventional frost-prevention approaches. For example, the disclosed system provides air with a higher percentage of relative humidity with substantially less heat required by the system than conventional methods. The disclosed system thus reduces the amount of extra/post humidification required in colder temperatures, such as during the fall and winter months (or in colder climates).

In an embodiment exemplifying the principles of the invention, the system may comprise an energy recovery wheel and a desiccant wheel positioned in a series circuit arrangement and each partially within a supply air passageway and partially within a return air passageway. A heating means preferably is positioned within the supply air passageway between the energy recovery wheel and the desiccant wheel. Damper(s) may be utilized to modulate flow within the system.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, together with the detailed description below, are incorporated in and form part of the specification, serve to illustrate further various exemplary embodiments and to explain various principles and advantages in accordance with the present invention.

DETAILED DESCRIPTION

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

The present invention is directed to a dual-wheel HVAC system featuring a heating means positioned within the supply air passageway between an energy recovery wheel and a desiccant wheel in order to control the temperature and humidity of air supplied to the indoor space while preventing frost build-up on the energy recover wheel. By positioning a heating means between the energy recovery wheel and the desiccant wheel, the system is capable of preventing frost accumulation on the energy recovery wheel while also increasing the relative humidity of the supply air, thereby reducing the amount of additional humidification required during winter conditions. The system also minimizes the amount of heat required to be added to the system as compared to conventional frost-prevention approaches.

Figure 4A:
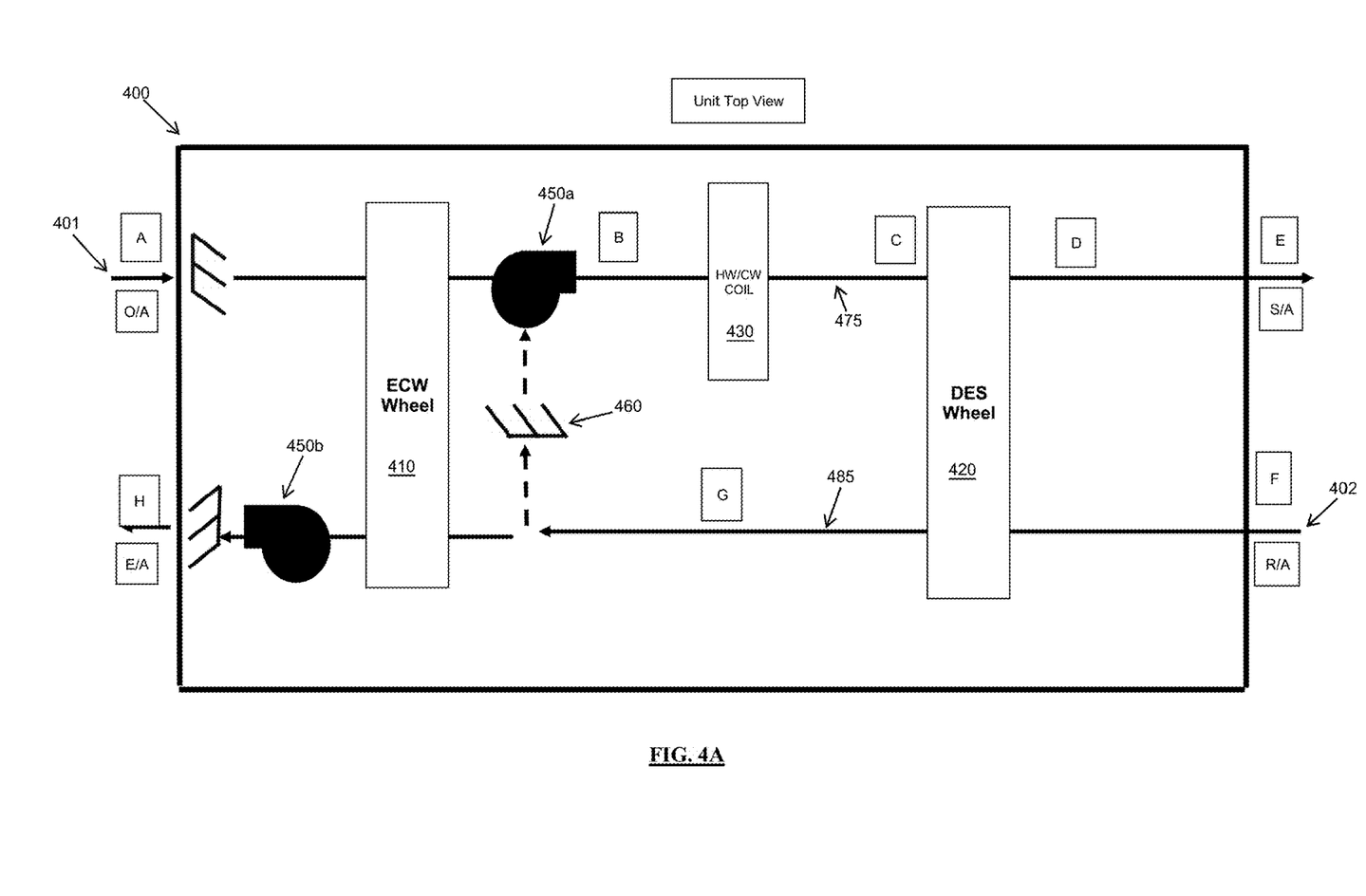
FIG. 4A is a schematic view of an exemplary dual-wheel energy recovery system employing features of the present invention.

A system embodying features of the present invention is shown schematically in FIG. 4A. The system 400 may comprise an energy recovery device 410, and a desiccant wheel 420, a heating means 430, a first air supplier 450*a*, and a second air supplier 450*b*.

The supply air stream 401 comprises outdoor air drawn from the atmosphere. The return air stream 402 comprises air drawn from a conditioned space. In certain embodiments, a damper 460 may be utilized to route air from the return air stream 402 back into the supply air stream 401 to provide a supply air stream 401 having a mixture of outdoor air and return air.

The energy recovery device 410 and the desiccant wheel 420 are preferably positioned in a series circuit arrangement. In the embodiment depicted in FIG. 4A, the energy recovery device 410 is an energy recovery wheel 410—a rotary counter flow air-to-air heat exchanger capable of transferring both sensible and latent (enthalpy) heat between air streams. In alternative embodiments, the energy recovery device 410 may be other known total energy exchangers, such as counter-flow and cross-flow plate exchangers or heat pipes. The energy recovery wheel 410 is disposed partially within the supply air stream 401 and partially within the return air stream 402. The desiccant wheel 420 is also disposed partially within the supply air stream 401 and partially within the return air stream 402. The energy recovery wheel 410 and the desiccant wheel 420 each may be partitioned into two sections to define a process side and a regeneration side. The "process side" or "process section" of the energy recovery wheel 410 and the desiccant wheel 420 is that portion of each wheel which is exposed to the supply air stream 401 at a given point in time. The "regeneration side" or "regeneration section" of the energy recovery wheel 410 and the desiccant wheel 420 is that portion of each wheel which is exposed to the return air stream 402 at a given point of time. The energy recovery wheel 410 and the desiccant wheel 420 both rotate such that each discrete portion of the wheel cycles through the supply air stream 401 and return air stream 402 in an iterative fashion.

Still referring to FIG. 4A, the heating means 430 is positioned within the supply air stream 401 between the energy recovery wheel 410 and the desiccant wheel 420. The energy recovery wheel 410 has its process side positioned in the supply air stream 401 upstream of the heating means 430, and the desiccant wheel 420 has its process side positioned in the supply air stream 401 downstream from the heating means 430.

In certain embodiments, the system 400 can be a single unit comprising a first passageway 475 generally parallel to a second passageway 485. In such embodiments, the first air supplier 450a and the heating means 430 may be positioned within the first passageway 475, while the second air supplier 450b may be positioned within the second passageway 485. Both the energy recovery wheel 410 and the desiccant wheel 420 may be located partially within the first passageway 475 and partially within the second passageway 485. A damper 460 can be utilized to modulate flow from the return air stream 402 back into the supply air stream 401. In the depicted embodiment, the first air supplier 450a is positioned in the first passageway 475 between the energy recovery wheel 410 and the heating means 430, while the second air supplier 450b is positioned in the second passageway 485 between the energy recovery wheel 410 and the exhaust outlet. However, in alternative embodiments, the first air supplier 450a can be positioned at other locations within the first passageway 475, and the second air supplier 450b can be positioned at other locations within the second passageway 485. In further other embodiments, the system components may be connected by ductwork. For example, air suppliers 450a, 450b may be positioned externally to the unit and connected by ductwork to the unit. Meanwhile, the energy recovery wheel 410, the desiccant wheel 420, and the other system components may be positioned in individual housings connected by ductwork.

The means for creating the supply air stream 401 and the return air stream 402 can be one or more air suppliers 450 such as fans, blowers, or any other means capable of moving air so as to create an air stream. The heating means 430 can comprise a heating heat exchanger or any means capable of raising the dry-bulb temperature of the air entering the system, including but not limited to direct heat sources (e.g., gas or electric heaters) or indirect heat sources (e.g., steam, hot water, solar, and waste heat from the building). For example, in certain embodiments, a heating coil 430 may be utilized to efficiently transfer heat from a steam, boiler water, solar water or high temperature hot water system to the supply air stream 401.

In heating mode, the energy recovery wheel 410 functions to heat and humidify the supply air stream 401 (i.e., the supply air) by transferring sensible and latent energy (moisture and heat) recovered from the return air stream 402 into the supply air stream 401 as the supply air stream passes through the process side of the wheel (the portion between Points A-B). The supply air stream 401 is then heated by passing it across the heating coil 430 (i.e., the portion between Points B-C). The supply air stream 401 is then slightly cooled and further humidified by passing it through the process side of the desiccant wheel 420 (the portion between Points C-D). The supply air stream 401 is then provided to the conditioned space. Meanwhile, energy is recovered from the return air stream 402 as the return air stream 402 passes sequentially through the regeneration sides of the desiccant wheel 420 and the energy recovery wheel 410. The return air stream 402 first will be dehumidified as it is transmitted through the regeneration side of the desiccant wheel 420, with the desiccant wheel 420 absorbing latent energy (i.e., moisture) from the return air stream 402 (the portion between Points F-G). Then, the return air stream 402 will be transmitted through the regeneration side of the energy recovery wheel 410, where both sensible and latent energy will be absorbed from the return air stream 402 (the portion between Points G-H).

In some embodiments, the disclosed system and method may include a cooling source within the supply passageway 475 between the energy recovery wheel 410 and the desiccant wheel 420 to allow the system to also operate in a cooling mode during summer conditions. In cooling mode, the energy recovery wheel 410 functions to cool and dehumidify the supply air stream 401 (i.e., the supply air) by transferring sensible and latent energy (moisture and heat) from the supply air stream 401 into the energy recovery wheel 410 as the supply air stream 401 passes through the process side of the wheel (the portion between Points A-B). The cooling source can comprise a cooling heat exchanger or any other means capable of cooling and/or dehumidifying a passing air stream. For example, in certain embodiments, a cooling tower can be utilized in combination with a water-cooled chiller to provide cooled water to a cooling coil installed within the system 400. Open-loop or closed-loop cooling systems may also be utilized. In one particular embodiment, a vapor-compression refrigeration system (DX system) may be utilized, with the condenser serving as the heating source 430 and the direct expansion evaporator coil serving as the cooling source. In another embodiment, a chiller or a cooling tower may be utilized, with a hot-water coil serving as the heating source 430 and a cold-water coil serving as the cooling source. In certain embodiments the same coil can serve as the heating source and the cooling source, with the type of heat exchanger being dictated by whether cold water or hot water is being supplied to the coil.

EXAMPLES

Figure 1A:
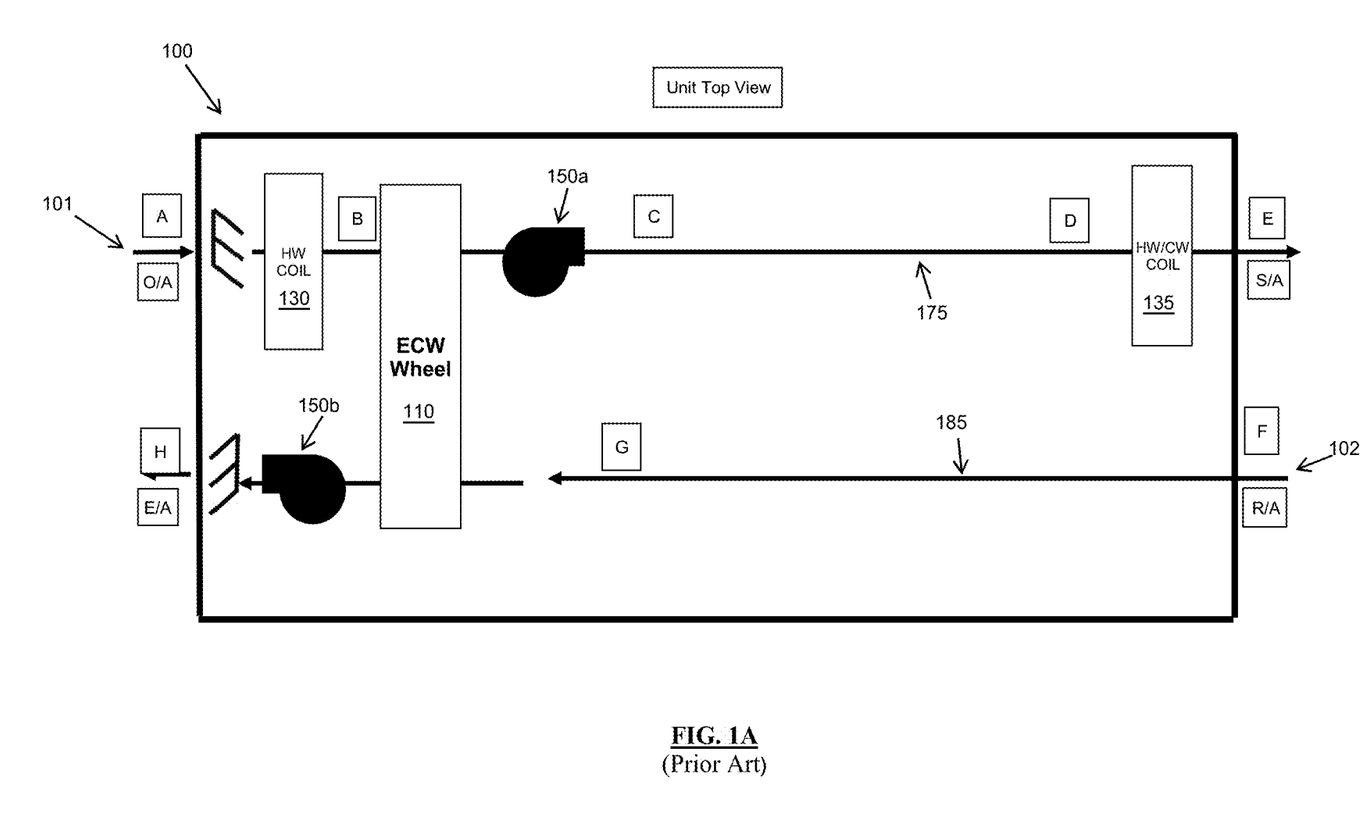
FIG. 1A is a schematic view of a prior art HVAC system.
Figure 2A:
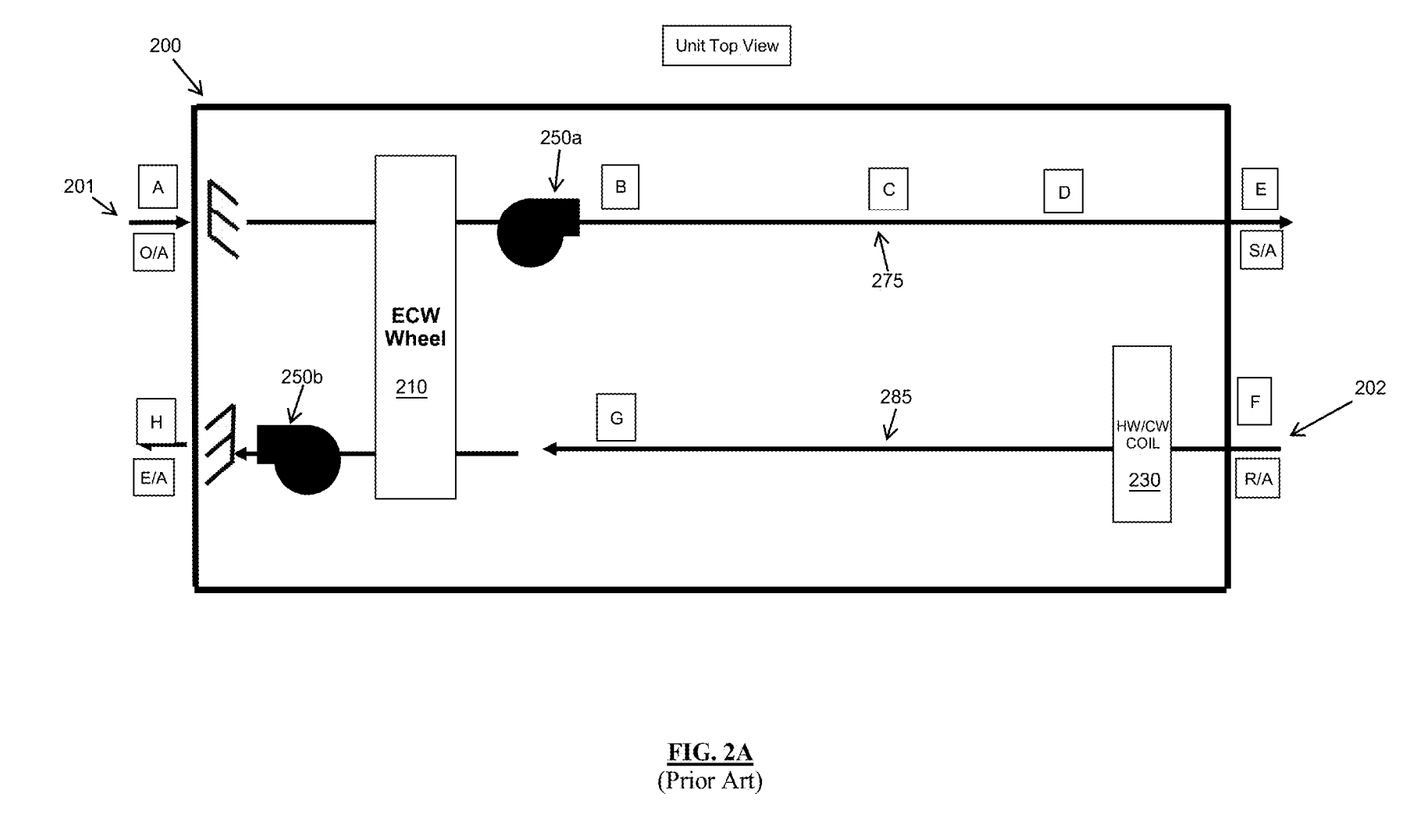
FIG. 2A is a schematic view of another prior art HVAC system.
Figure 3A:
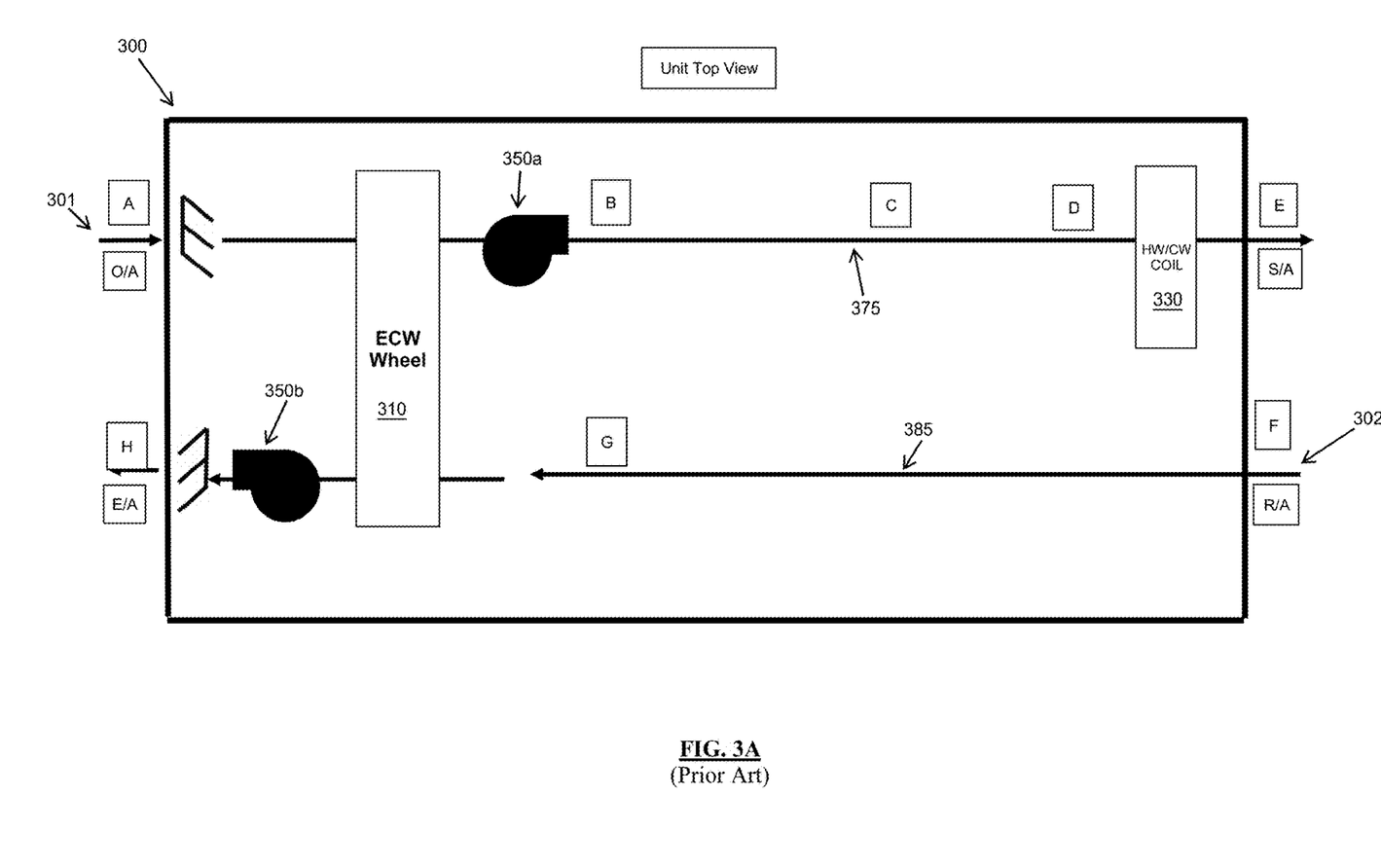
FIG. 3A is a schematic view of another prior art HVAC system.

Computer simulations were run to compare the performance of the disclosed system against the prior art systems depicted in FIGS. 1-3 when processing cold, humid outdoor air. For each simulation, Novelaire Model No. ECW786 energy recovery wheels were utilized at the tested system's energy recovery wheel, and Model No. DES786 desiccant wheels were utilized as the tested system's desiccant wheel. Novelaire Model No. ECW786 is an energy recovery (i.e., conservation) wheel comprising corrugated synthetic fiber-based media impregnated with a non-migrating water selective molecular sieve desiccant. The wheel diameter is 78 inches with a depth of 6 inches. Novelaire Model No. DES786 is a high performance silica gel (WSG) desiccant wheel having a diameter of 78 inches and a depth of 6 inches. For comparison purposes, electrical power has been assumed to cost $0.10/Kwh, natural gas for the hot water coil has been assumed to cost $10.00/MMBTU for each simulation.

Example 1

PRIOR ART

Figure 1B:
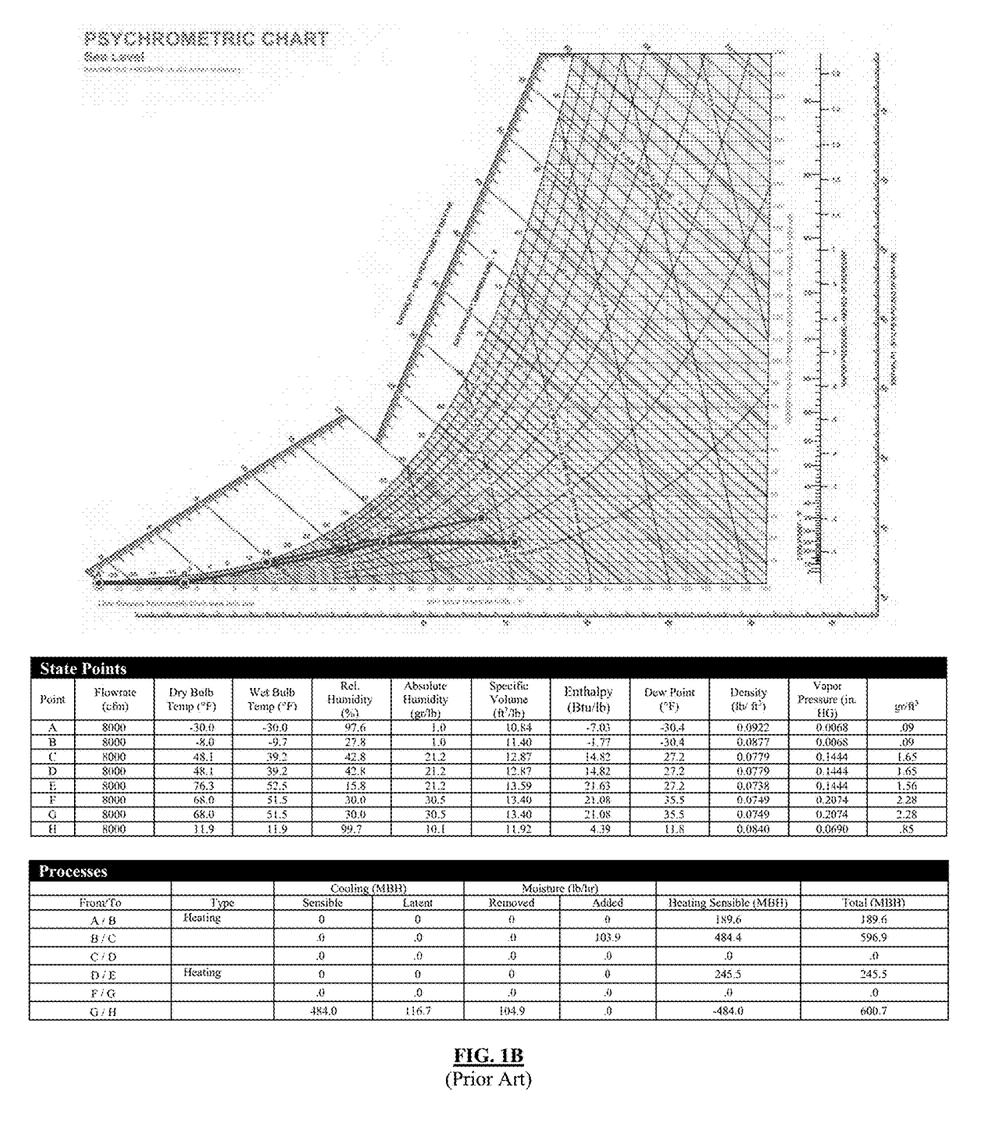
FIG. 1B is a psychrometric chart showing the performance of the HVAC system depicted in FIG. 1A.

Referring to the psychometric chart depicted in FIG. 1B, an example of the performance of the dehumidification system depicted in FIG. 1A is shown. In this example, the system 100 is utilizing a Novelaire Model No. ECW786 energy recovery wheel 110 rotating at 35 revolutions per minute, a hot water coil 130 positioned in the supply passageway 175 upstream of the energy recovery wheel 110, a hot water coil 135 positioned in the supply passageway 175 downstream of the energy recovery wheel 110, a 10 HP supply air fan 150a, and a 10 HP return air fan 150b. Winter operations are presumed with a −30.0° F. outdoor temperature.

Referring to FIG. 1B, a supply air stream 101 having a dry-bulb temperature of −30.0° F. and moisture contents of 1.0 grains/lb (Point A) is drawn into the supply air passageway 175 by the supply air fan 150a. The supply air stream 101 is warmed to −8.0° F. as it is passed through the hot water coil 130. The supply air stream 101 is further warmed to 48.1° F. and humidified to 21.2 grains/lb (Point C) as the air passes through the process side of the energy recovery wheel 110. The supply air stream 101 is further warmed to 76.3° F. (Point E) as the air passes through a second hot water coil 135. The supply air 101 entering the conditioned space exhibits a dry bulb temperature of 76.3° F., 15.8% relative humidity, and a moisture content of 21.2 grains/lb (Point E). Meanwhile, a return air stream 102 having a dry-bulb temperature of 68.0° F. and moisture contents of 30.5 grains/lb (Point F) is drawn into the return air passageway 185 by the return air fan 150b. The return air stream 102 is passed through the regeneration side of the energy recovery wheel 110, transferring both sensible and latent energy to the wheel 110. The return air stream 102 is exhausted from the system 100 at 11.9° F., 99.7% relative humidity, and a moisture content of 10.1 grains/lb (Point H). Under these parameters, 435,096 BTU/hr of heat is required by the system 100 to provide supply air having a dry bulb temperature of 76.3° F., an absolute humidity of 21.2 gr/lb, and an enthalpy of 21.60 BTU/lb. The estimated operating cost of the system 100 is $5.23 per hour.

Example 2

PRIOR ART

Figure 2B:
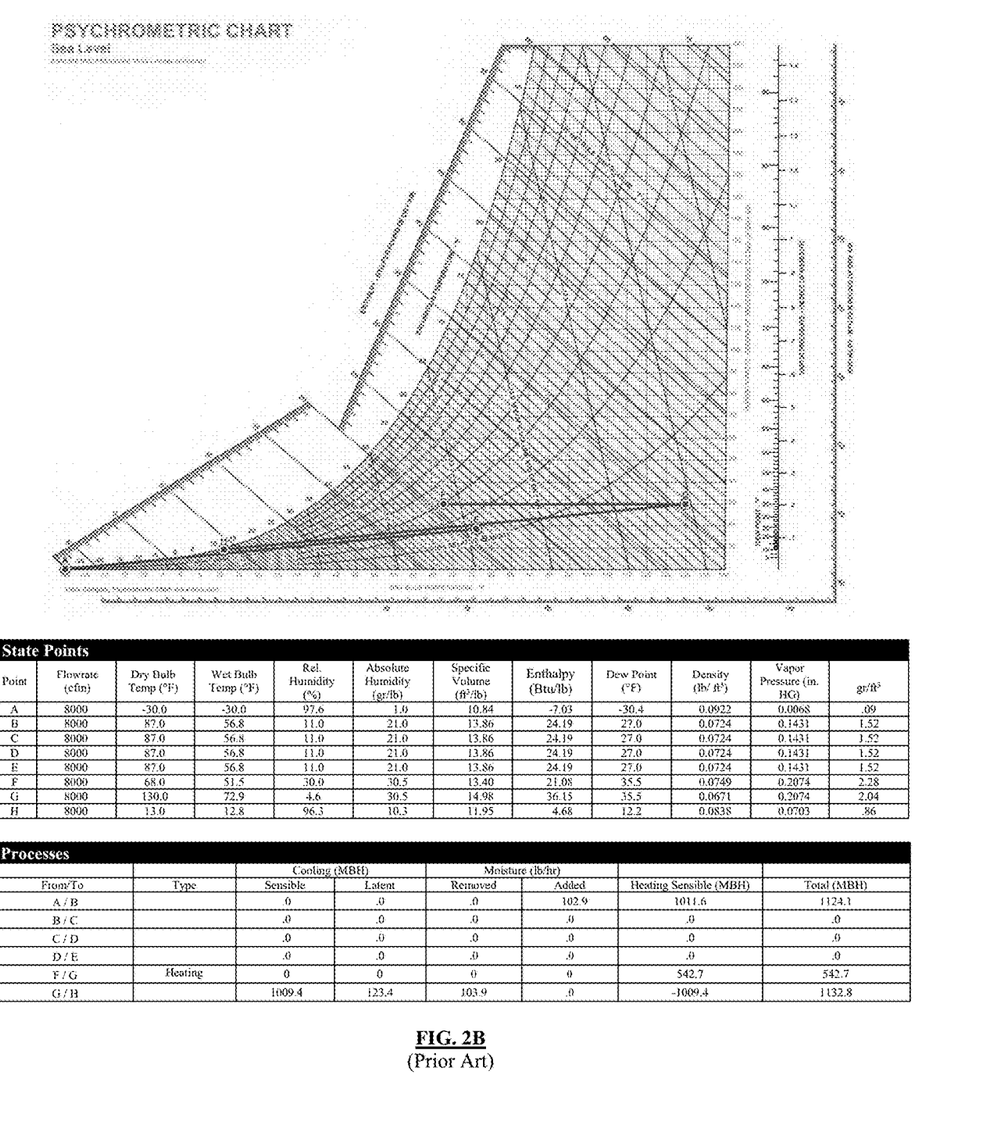
FIG. 2B is a psychrometric chart showing the performance of the HVAC system depicted in FIG. 2A.

Referring to the psychometric chart depicted in FIG. 2B, an example of the performance of the dehumidification system depicted in FIG. 2A is shown. In this example, the system 200 is utilizing a Novelaire Model No. ECW786 energy recovery wheel 210 rotating at 35 revolutions per minute, a hot water coil 235 positioned in the return passageway upstream of the energy recovery wheel 210, a 10 HP supply air fan 250a, and a 10 HP return air fan 250b. Winter operations are presumed with a –30.0° F. outdoor temperature.

Referring to FIG. 2B, a supply air stream 201 having a dry-bulb temperature of –30.0° F. and moisture contents of 1.0 grains/lb (Point A) is drawn into the supply air passageway 275 by the supply air fan 250a. The supply air stream 201 is warmed to 87.0° F. and humidified to 21.0 grains/lb (Point B) as the air passes through the process side of the energy recovery wheel 210. The supply air 201 entering the conditioned space exhibits a dry bulb temperature of 87.0° F., 11.0% relative humidity, and a moisture content of to 21.0 grains/lb (Point E). Meanwhile, a return air stream 202 having a dry-bulb temperature of 68.0° F. and moisture contents of 30.5 grains/lb (Point F) is drawn into the return air passageway 285 by the return air fan 250b. The supply air stream 201 is warmed to 130.0° F. and 4.6% relative humidity as it is passed through the hot water coil 235 (Point G). The return air stream 202 is passed through the regeneration side of the energy recovery wheel 210, transferring both sensible and latent energy to the wheel 210. The return air stream 202 is exhausted from the system 100 at 13.0° F. and having a moisture content of 10.3 grains/lb (Point H). Under these parameters, 542,670 BTU/hr of heat is required by the system 200 to provide supply air having a dry bulb temperature of 87.0° F., an absolute humidity of 21.0 gr/lb, and an enthalpy of 24.2 BTU/lb. The estimated operating cost of the system 200 is $6.31 per hour.

Example 3

PRIOR ART

Figure 3B:
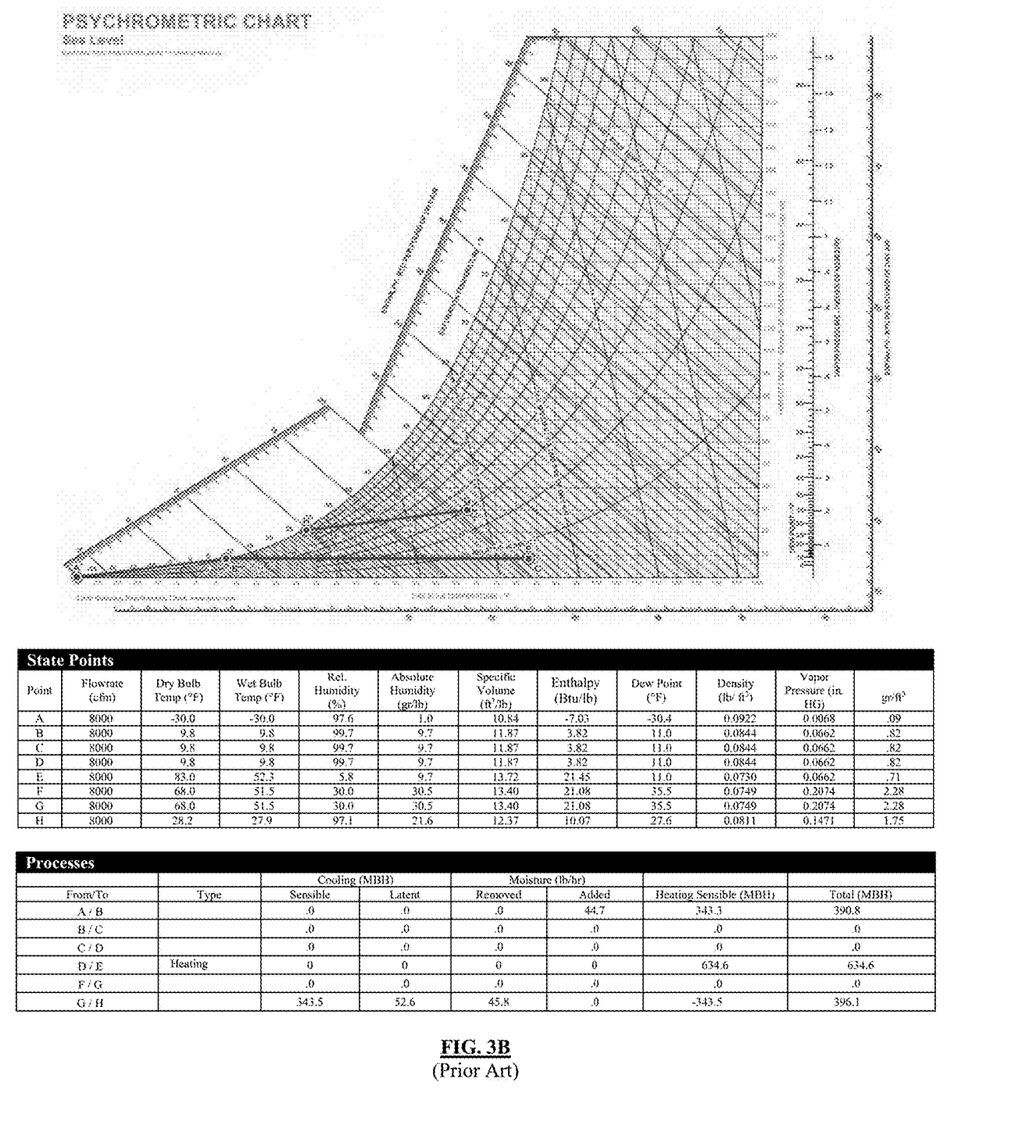
FIG. 3B is a psychrometric chart showing the performance of the HVAC system depicted in FIG. 3A.

Referring to the psychometric chart depicted in FIG. 3B, an example of the performance of the dehumidification system depicted in FIG. 3A is shown. In this example, the system 300 is utilizing a Novelaire Model No. ECW786 energy recovery wheel 310 rotating at 1.0 revolutions per minute, a hot water coil 335 positioned in the supply passageway 375 downstream of the energy recovery wheel 310, a 10 HP supply air fan 350a, and a 10 HP return air fan 350b. Winter operations are presumed with a –30.0° F. outdoor temperature.

Referring to FIG. 3B, a supply air stream 301 having a dry-bulb temperature of –30.0° F. and moisture contents of 1.0 grains/lb (Point A) is drawn into the supply air passageway 375 by the supply air fan 350a. The supply air stream 301 is warmed to 9.8° F. and humidified to 9.7 grains/lb (Point B) as the air passes through the process side of the energy recovery wheel 310. The supply air stream 301 is further warmed to 83.0° F. (Point E) as the air passes through the hot water coil 335. The supply air 301 entering the conditioned space exhibits a dry bulb temperature of 83.0° F., 5.8% relative humidity, and a moisture content of 9.7 grains/lb (Point E). Meanwhile, a return air stream 302 having a dry-bulb temperature of 68.0° F. and moisture contents of 30.5 grains/lb (Point F) is drawn into the return air passageway 385 by the return air fan 350b. The return air stream 302 is passed through the regeneration side of the energy recovery wheel 310, transferring both sensible and latent energy to the wheel 310. The return air stream 302 is exhausted from the system 300 at 28.2° F., 97.1% relative humidity, and a moisture content of 21.1 grains/lb (Point H). Under these parameters, 634,633 BTU/hr of heat is required by the system 300 to provide supply air having a dry bulb temperature of 83.0° F., an absolute humidity of 9.7 gr/lb, and an enthalpy of 21.5 BTU/lb. The estimated operating cost of the system 300 is $7.23 per hour.

Example 4

In the embodiment of the present invention depicted in FIG. 4A, a hot water coil is added to the system 400 within the supply air passageway 475 between an energy recovery wheel 410 and a desiccant wheel 420 in order to control the temperature and humidity of air supplied to the indoor space while preventing frost build-up on the energy recover wheel 410. The system of the present invention is capable of preventing frost accumulation on the energy recovery wheel while also increasing the relative humidity of the supply air, thereby reducing the amount of additional humidification required during winter conditions.

Figure 4B:
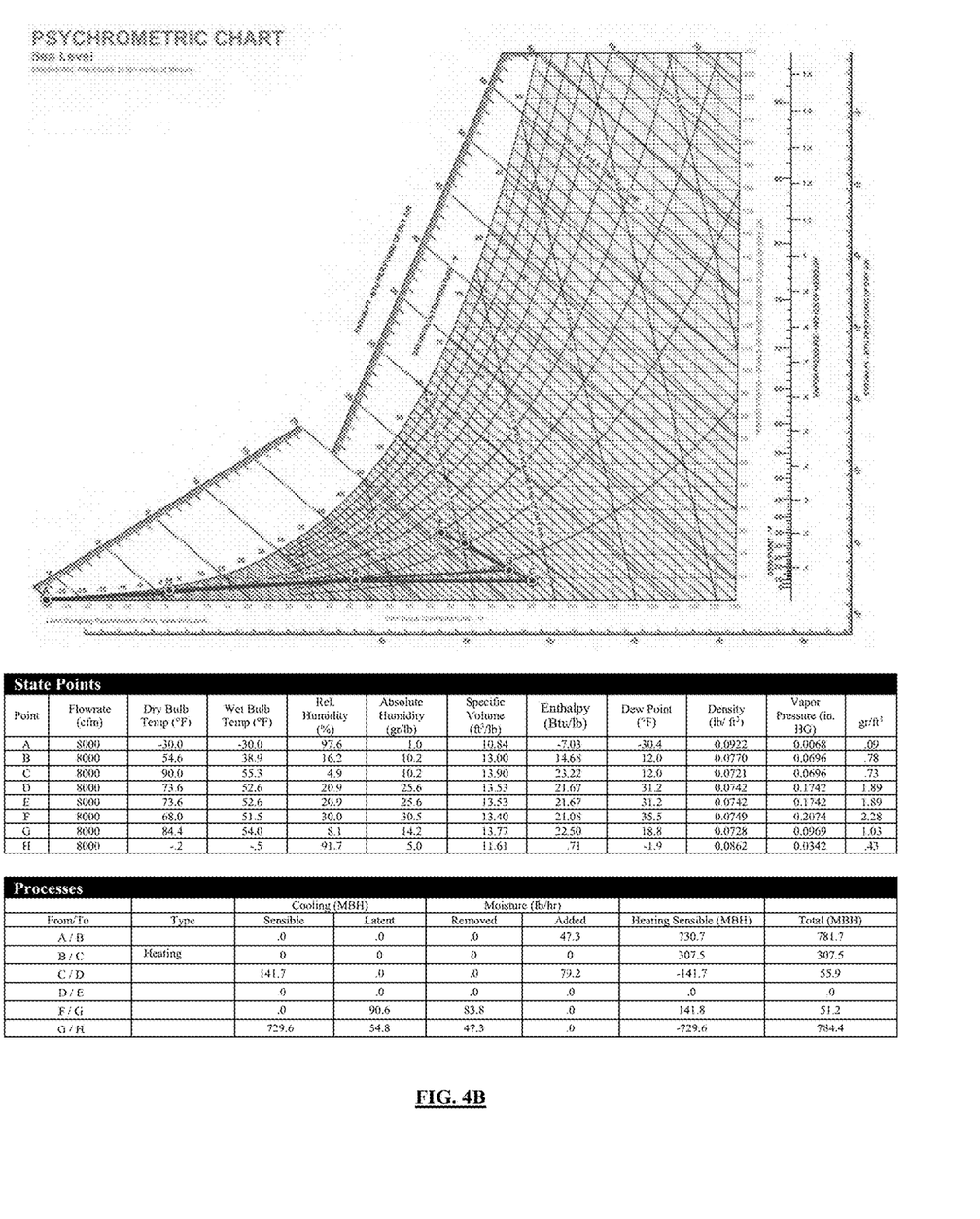
FIG. 4B is a psychrometric chart showing the performance of the dual-wheel energy recovery system depicted in FIG. 2A at a dry bulb temperature of −30° F.

Referring to the psychometric charts depicted in FIG. 4B, an example of the performance of the HVAC system 400 depicted in FIG. 4A is shown. In this example, the system 400 is utilizing a Novelaire Model No. ECW786 energy recovery wheel 310 rotating at 35 revolutions per minute, a Novelaire Model No. DES786 desiccant wheel 320 rotating at 30 revolutions per hour, a hot water coil 430 positioned in the supply passageway 475 downstream of the energy recovery wheel 310 and upstream of the desiccant wheel 420, a 10 HP supply air fan 450a, and a 10 HP return air fan 450b. Winter operations are presumed with a –30.0° F. outdoor temperature.

Referring to FIG. 4B, a supply air stream 401 having a dry-bulb temperature of –30.0° F. and moisture contents of 1.0 grains/lb (Point A) is drawn into the supply air passageway 475 by the supply air fan 450a. The supply air stream 401 is warmed to 54.6° F. and humidified to 10.2 grains/lb (Point B) as the air passes through the process side of the energy recovery wheel 410.

The supply air stream 401 is further warmed to 90.0° F. (Point C) as the air passes through the hot water coil 430. Next, the supply air stream 401 is slightly cooled and further humidified to 73.6° F. and 25.6 grains/lb (Point D) by passing it through the process side of the desiccant wheel 420. The supply air 401 entering the conditioned space exhibits a dry bulb temperature of 73.6° F., 20.9% relative humidity, and a moisture content of 25.6 grains/lb (Point E). Meanwhile, a return air stream 402 having a dry-bulb temperature of 68.0° F. and moisture contents of 30.5 grains/lb (Point F) is drawn into the return air passageway 485 by the return air fan 450b.

The return air stream 402 first will be dehumidified as it is transmitted through the regeneration side of the desiccant wheel 420, with the desiccant wheel 420 absorbing latent energy (i.e., moisture) from the return air stream 402 (the portion between Points F-G). The return air stream 402 leaving the desiccant wheel 420 will exhibit a dry-bulb temperature of 84.4.0° F. and moisture contents of 14.2 grains/lb (Point G). The return air stream 402 is then passed through the regeneration side of the energy recovery wheel 410, transferring both sensible and latent energy to the wheel 410. The return air stream 402 is exhausted from the system 400 at −0.2° F., 91.7% relative humidity, and a moisture content of 5.0 grains/lb (Point H). Under these parameters, 307,500 BTU/hr of heat is required by the system 400 to provide supply air having a dry bulb temperature of 73.6.0° F., an absolute humidity of 25.6 gr/lb, and an enthalpy of 21.67 BTU/lb. The estimated operating cost of the system 400 is $3.95 per hour.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A HVAC system, comprising:
   (i) a plurality of air suppliers for creating a plurality of distinct air streams, the plurality of air suppliers comprising a first air supplier for creating a first air stream and a second air supplier for creating a second air stream;
   (ii) an energy recovery device defining a regeneration side and a process side, wherein the process side is positioned in the first air stream, and wherein the regeneration side is positioned in the second air stream;
   (iii) a desiccant wheel defining a regeneration side and a process side, wherein the process side is positioned in the first air stream at a position downstream of the energy recovery device, and wherein the regeneration side is positioned in the second air stream;
   (iv) a heating means positioned within the first air stream between the energy recovery device and the desiccant wheel;
   (v) wherein the first air supplier has an air intake and air exhaust positioned along the first air stream between the energy recovery device and the heating means; and
   (vi) a damper configured to allow the first air supplier to draw air from the second air stream between the desiccant wheel and the energy recovery device, and direct the air into the first air stream between the energy recovery device and the heating means.

2. The method of claim 1, wherein a dry bulb temperature of the first portion of the supply first air stream is less than 0.0° F.

3. The HVAC system of claim 1, wherein the heating means is an indirect heating heat exchanger.

4. The HVAC system of claim 3, wherein the indirect heating heat exchanger comprises a heating coil.

5. The HVAC system of claim 3, wherein the indirect heating heat exchanger is a condenser unit.

6. The HVAC system of claim 1, further comprising an enclosure having a supply air passageway and a return air passageway, wherein the first air stream is transmitted through the supply air passageway, and wherein the second air stream is transmitted through the return air passageway.

7. The HVAC system of claim 6, wherein the process side of the energy recovery device is positioned in the supply air passageway, and wherein the regeneration side of the energy recovery device is positioned in the return air passageway.

8. The HVAC system of claim 7, wherein the process side of the desiccant wheel is positioned in the supply air passageway, and wherein the regeneration side of the desiccant wheel is positioned in the return air passageway.

9. A dual-wheel HVAC system, comprising:
   (i) an enclosure comprising: i) a supply air passageway having a supply air inlet and supply air outlet; and ii) a return air passageway having a return air inlet and a return air outlet;
   (ii) an energy recovery wheel defining a regeneration side and a process side, wherein the process side of the energy recovery wheel is positioned in the supply air passageway, and wherein the regeneration side of the energy recovery wheel is positioned in the return air passageway;
   (iii) a desiccant wheel defining a regeneration side and a process side, wherein the process side of the desiccant wheel is positioned in the supply air passageway, and wherein the regeneration side of the desiccant wheel is positioned in the return air passageway;
   (iv) a heating heat exchanger positioned within the supply air passageway between the process side of the energy recovery wheel and the process side of the desiccant wheel; and
   (v) a damper configured to allow air to be drawn from a second air stream between the desiccant wheel and the energy recovery wheel, and directed into a first air stream between the energy recovery wheel and the heating heat exchanger.

10. The HVAC system of claim 9, wherein the heating heat exchanger is an indirect heating heat exchanger.

11. The HVAC system of claim 10, wherein the indirect heating heat exchanger comprises a heating coil.

12. The HVAC system of claim 10, wherein (i) a first air supplier has an air intake and air exhaust positioned along the supply air passageway between the energy recovery wheel and the indirect heating heat exchanger, and (ii) the first air supplier pulls air from the damper.

* * * * *